R. D. KING.
CORN KILN.
APPLICATION FILED APR. 2, 1915.
1,152,644.
Patented Sept. 7, 1915.
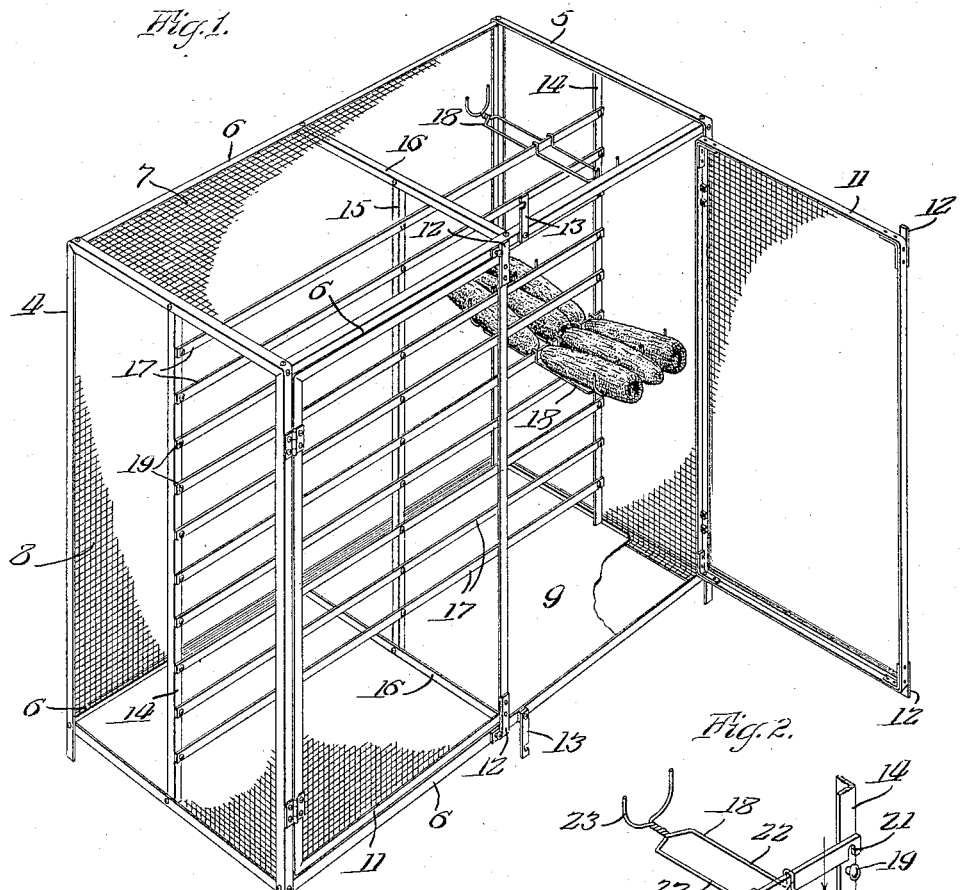
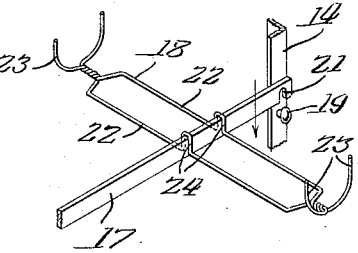
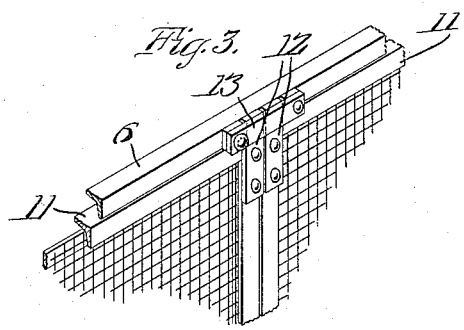
Witnesses:
W. L. Dow.
John F. McCann.
Inventor:
Raymond D. King
By Pond & Wilson
Attys.

UNITED STATES PATENT OFFICE.

RAYMOND D. KING, OF LAMOILLE, ILLINOIS.

CORN-KILN.

1,152,644.  Specification of Letters Patent.  Patented Sept. 7, 1915.

Application filed April 2, 1915. Serial No. 18,821.

*To all whom it may concern:*

Be it known that I, RAYMOND D. KING, a citizen of the United States, residing at Lamoille, in the county of Bureau and State of Illinois, have invented certain new and useful Improvements in Corn-Kilns, of which the following is a specification.

This invention relates to corn kilns in which ears of corn may be properly dried and preserved to be used as seed.

Farmers now quite generally select and dry their own seed corn, and because of inadequate equipment and improper methods of drying and storing the corn, much corn intended for seed is injured. The importance of properly drying and preserving corn for seed is obvious, since if the germ of a kernel is injured, the seed will not germinate.

Heretofore, the general practice, so far as I am aware, of drying corn for seed has been to provide hangers adapted to carry a plurality of ears of corn and to place these hangers, unprotected, in some properly ventilated room, such as in a granary or storeroom, where the corn will dry under proper climatic conditions. Since the corn is unguarded, it is very frequently damaged by mice and also accidentally knocked from the hangers, thus chipping the kernels and permitting air to enter the same, which will kill the germ. It is customary to remove the corn from the hangers after a drying period of about six weeks and to store the corn in boxes or on shelves until the planting season arrives. Such practice, of course, gives no assurance that the corn will not be injured by being chipped, eaten by mice, or becoming molded by close confinement. Moreover, when ears are held on hangers having pointed prongs stuck into the butt ends of the cobs for supporting the same, the ears often fall from the hangers by reason of the cobs shrinking when drying and becoming loosened on the prongs.

The primary object of my invention is to provide a kiln for drying and storing ears of corn for seed in such manner as to insure proper drying and preservation of seed, and to provide against the defects and undesirable features common to corn-drying and storing means now used.

A further object of my invention is to provide a corn kiln of simple and improved construction, and one that may be shipped in knocked-down condition and be manufactured at a low cost.

A further object is to provide a corn kiln comprising a cage-like container adapted to be opened from one side, and to mount within the container means for supporting horizontal rows of ears of corn arranged side by side in close proximity and with the rows arranged one above the other, and to provide such corn-supporting means or hangers as may be removed from the container, each row independently, whereby ears of corn may be packed in the container starting from the hangers or supports at the bottom thereof and adding row upon row thereabove, and whereby in inverse order the corn and hangers may be removed from the container starting from the top row.

A still further object is to provide a cage-like corn container having corn-hanging means removably mounted therein, whereby upon removal of said corn-hanging means, the container may be used for miscellaneous storing purposes.

Other objects and attendant advantages of my invention will be readily apparent as the invention becomes better understood by reference to the following detailed description when considered in connection with the accompanying drawings, wherein:

Figure 1 is a perspective of a corn kiln embodying my invention, but showing only a few of the corn-hangers mounted in the container; Fig. 2 is an enlarged detail view in perspective of a single corn-hanger and the means for supporting it; and Fig. 3 is also an enlarged detail view in perspective showing the means for locking the doors of the container.

Referring to the drawings, it will be observed that my improved corn kiln comprises in general a cage-like container within which is mounted means for supporting ears of corn in a particular manner. The container, constructed of angle-iron strips and with screening or mesh-work, comprises rectangular end-sections 4 and 5, each forming a separate perforate wall, and angle-bars 6 joining the corners of the said end-sections for holding them in upright spaced relation, whereby a box-like structure is formed. The top 7 and side walls 8 are suitably covered with wire screening or mesh-work, which is broken away in the drawings simply so as not to obstruct from view the corn-hanging means within the container. The bottom of the container may be covered by an imperforate strip of sheet-metal 9 or any other suitable material. The open side of the container is adapted to be closed by any suitable means, and preferably, by a pair of doors 11 formed of angle-iron frames and wire mesh-work, as shown, and hinged, respectively to the end sections 4 and 5. It will be observed that since the container structure illustrated is joined together by ordinary screws and bolts connecting the angle-iron sections, it may be disassembled and packed in a comparatively small space, the end-sections 4 and 5, the doors, and bottom 9, being packed as integral members one upon the other. Suitable means may be provided for locking the doors closed, and as shown, I have provided a separate lock at both the top and the bottom of the doors, each lock comprising metal strips 12 riveted to the outer corners of the doors, extending above and below the same, and latch members 13 pivotally mounted on the front top and bottom bars 6 and adapted to swing in front of said door extensions 12 when the doors are closed and to engage a suitable headed bolt as shown in Fig. 3.

The means disposed within the container for supporting ears of corn are mounted on upright angle-bars 14 secured to the end-sections 4 and 5 midway between the sides thereof, and on a central upright angle bar 15, secured to cross bars 16, which are mounted on bars 6. The corn-supporting means comprise a plurality of horizontal hanger-supporting bars 17 and a plurality of corn-hangers designated generally by reference character 18 and adapted to be mounted on said supporting bars. The supporting bars 17 are mounted one above the other on the bars 14 and 15 in the manner clearly shown in Fig. 1 and are detachably held in operative position by suitable means whereby each bar 17 may be individually removed from the container through the open side thereof. A simple means for removably mounting these bars 17 is provided by fixedly mounting upon the upright supporting bars suitable headed pins 19 vertically spaced apart as shown, and by forming the bars 17 with notches 21 permitting the bars to be moved downwardly so that their notched portions will coöperate with the pins 19, thereby holding the bars in operative position and from dislodgment except in an upward direction, whereby the bars may be removed.

Each bar 17 provides a support for a plurality of corn-hangers 18, adapted to carry two ears of corn in substantially longitudinal alinement and extending transversely to its supporting bar and with one ear of corn disposed on each side of the bar. Each hanger is formed of two strips of wire 22 spaced apart in parallel relation, twisted together adjacent to each end, and having their ends 23 turned upwardly and outwardly forming forked ends. The hanger strips 22 are looped as at 24 to engage a supporting bar 17, whereby the hanger will be supported with its corn-holding portions extending laterally from said bar in opposite directions and whereby the hanger may be moved longitudinally on said bar and removed therefrom at will. It will be obvious that instead of connecting the wire-sections 22 by twisting them together adjacent to their ends, such connections might be otherwise made, as for instance, by spot-welding the wire sections together at these points. Ears of corn may be placed on the hangers in the manner shown in Fig. 1, the spaced body members and the forked ends of the hangers preventing the ears from being laterally displaced.

To fill the kiln with corn all of the supporting bars 17, except the lowermost one, are removed. Hangers 18 are then mounted side by side on the bottom support 17 and ears of corn are placed on the hangers. In order to carry a maximum number of hangers on the support the ears are arranged with their butt-ends alternating in the manner shown in Fig. 1, it being obvious that since ears of corn are generally larger at their butts than their tips, more ears may be packed side by side in a given length in said alternate arrangement than if arranged with their butts all at one end. It will be noted that the hangers are individually adjustable laterally to permit the necessary adjustment for the above alternate arrangement of the ears. A second supporting bar is then mounted on the bars next above the lowermost one, hangers are mounted on said bar and packed with ears of corn in the above described manner; and in like manner the remaining supporting bars and hangers are mounted and arranged in the container.

From the foregoing, it will be apparent that the container is divided by the supporting bars 17 into two general corn-containing compartments; the hangers mounted on the supporting bars provide means for carrying ears of corn in each compartment; and that the ears are arranged in close proximity in a novel manner, whereby a maximum number of ears may be systematically packed in a limited space. It will also be noted that when the doors of the kiln are closed and locked, the corn is protected by the cage-like structure from being damaged and may be left in the kiln untouched until the time for planting, with assurance that the corn will not be eaten by mice or chipped by being dropped; and that the open work structure of the cage, and the hangers and supports therefor, is such as permits air to circulate freely through the kiln, thus insuring that the corn will be properly dried when the kiln is placed in a room properly ventilated.

The corn may be removed from the kiln by commencing at the top thereof and removing the ears, hangers and supporting bars thereof, and the remaining rows in succession as will be obvious. It will be noted that by removal of the corn-hanging means, located on top, access is permitted to the row of corn immediately thereunder and farthest from the open side of the container; that the corn hanging means are entirely interchangeable; and that the novel corn hanging means permit the corn to be packed to the best of advantage. Also, after all of the hangers and supporting bars have been removed, the container may be used for general storing purposes, as is desirable, since kilns of this character will be generally kept in granaries and storerooms, which are more or less infested with mice.

Corn kilns embodying my invention may be built in various sizes, and since it is desirable to make a single kiln of sufficient size so that a farmer may place in it all the corn necessary to plant an ordinary crop, such as would require about 1500 ears of seed corn, a kiln may be very practically built according to my invention to hold such number of ears, and at the same time occupy comparatively small floor space. When it is desirable to dry and store large quantities of seed corn, it is obvious that more than one kiln may be used.

It will also be apparent that the details of construction and relative arrangement of parts might be variously modified without involving any substantial change in structure or its principles of operation. It should, therefore, be understood that I do not limit myself to the exact construction herein shown and described, but reserve the right to make such variations therein as fall within the spirit and scope of the invention.

I claim:

1. A corn kiln comprising a perforate container having an open side and a movable closure adapted to cover said open side, and means for supporting ears of corn within the container comprising corn-hanger supports arranged in a general vertical plane dividing the container intermediate its open side and the side opposite thereto into two general corn-containing compartments, and corn-hanging means mounted on said supports in each of said compartments, certain of said supports being removable from the container to permit access through said open side to the compartment farthest therefrom.

2. A corn kiln comprising a perforate container having an open side and a movable closure adapted to cover said open side, and means for supporting ears of corn within the container comprising a plurality of horizontal corn-hanger supports removably mounted and disposed one above the other dividing the container intermediate said open side and the side opposite thereto into two general corn-containing compartments, and corn-hanging means mounted on said supports in each of said compartments.

3. A corn kiln comprising a cage-like container having an open side and provided with a movable closure adapted to cover said open side, and corn-hangers mounted in the container and arranged to support ears of corn in tiers arranged one above the other, said tiers each comprising two rows of ears of corn extending parallel with the open side of the container with the ears extending crosswise of the rows, the tiers of hangers being independently removable from the container through its open side, whereby the tiers above any given tier may be removed to permit access through said open side to both rows of corn in said given tier.

4. A corn kiln comprising a cage-like housing inclosing a corn-containing compartment, a plurality of horizontal bars arranged in said compartment spaced apart in substantially vertical alinement and being independently movable out of operative position, each bar forming a support upon which a row of corn-hangers may be mounted, and a plurality of corn-hangers, each comprising a pair of spaced, forked members, and means connecting said forked members and forming therewith a support upon which two ears of corn may be held in substantially longitudinal alinement and from lateral displacement, said hangers being each provided with means intermediate their forked members whereby the hangers may be removably mounted on the supporting bars with the ears of corn extending transversely of said bars.

5. A corn kiln comprising a cage-like container, and means disposed within the container for holding ears of corn, comprising individual corn-hangers each adapted to hold two ears of corn in substantially longitudinal alinement, and means for supporting said hangers in close proximity in horizontal rows one above the other, whereby tiers of rows are formed, each tier comprising two parallel rows of ears of corn.

6. A corn kiln comprising a cage-like container, and means disposed within the container for holding ears of corn, comprising vertically spaced horizontal bars removably mounted, and corn-hangers removably mounted on said bars, each hanger being shaped to carry two ears of corn in substantially longitudinal alinement.

7. Means for holding ears of corn, comprising a wire hanger shaped to provide a pair of spaced upright forked members adapted each to receive and hold an ear of corn from lateral displacement and with the ears of corn in substantially longitudinal alinement.

8. Means for holding ears of corn, comprising a wire hanger shaped to provide a pair of spaced upright forked members adapted each to receive and hold an ear of corn from lateral displacement and with the ears of corn in substantially longitudinal alinement, and means for supporting a plurality of hangers in a substantially common plane with the hangers arranged side by side in close proximity.

9. A corn kiln comprising an open-work container, and means disposed within the container for holding ears of corn, comprising individual corn-hangers each arranged to carry an ear of corn in such manner as not to penetrate the ear, and with the ear extending in a substantially horizontal plane, and means for supporting said hangers, side by side, in a substantially common horizontal plane and whereby each hanger may be individually laterally adjusted whereby to arrange the ears of corn in close proximity.

10. Means for holding ears of corn comprising a plurality of corn hangers each formed of two wire sections spaced in substantially horizontal and parallel relation, connected at points between and in proximity to their ends and having their ends turned upwardly and outwardly whereby each adjacent pair of ends forms a forked rest to receive and hold an ear of corn from lateral displacement, and whereby the ears on each hanger also rests upon the spaced wire sections and are disposed in substantially endwise alinement, and means for supporting the hangers.

11. Means for holding ears of corn comprising a plurality of corn hangers each formed of two wire sections spaced in substantially horizontal and parallel relation, connected at points between and in proximity to their ends and having their ends turned upwardly and outwardly whereby each adjacent pair of ends forms a forked rest to receive and hold an ear of corn from lateral displacement and whereby the ears on each hanger also rest upon the spaced wire sections and are disposed in substantially endwise alinement, and a horizontal hanger-supporting bar, the wire sections of each hanger being bent intermediate the ends thereof to engage the bar so that the hanger will extend transversely with respect thereto and be removable therefrom and adjustable laterally thereon.

RAYMOND D. KING.

Witnesses:
JOHN F. McCANNA,
DELLA ATKINSON.

Copies of this patent may be obtained for five cents each, by addressing the "Commissioner of Patents, Washington, D. C."